United States Patent
Khokhar

Patent Number: 6,128,809
Date of Patent: Oct. 10, 2000

[54] CABLE TIE HAVING A LOCKING HEAD AND A SEPARATE STRAP

[75] Inventor: Wasim Khokhar, Cordova, Tenn.

[73] Assignee: Thomas & Betts International, Inc., Sparks, Nev.

[21] Appl. No.: 09/203,278

[22] Filed: Dec. 1, 1998

Related U.S. Application Data

[60] Provisional application No. 60/067,183, Dec. 1, 1997.

[51] Int. Cl.[7] .................................................. B65D 63/00
[52] U.S. Cl. ...................................... 24/168 B; 24/30.5 P
[58] Field of Search ................................ 24/168 B, 16 R, 24/30.5 P, 30.5 R, 17 AP, 17 A, 20 R, 20 EE; 248/74.3

[56] References Cited

U.S. PATENT DOCUMENTS

| | | |
|---|---|---|
| 3,588,961 | 6/1971 | Farago . |
| 3,816,878 | 6/1974 | Fulton et al. . |
| 3,875,618 | 4/1975 | Schuplin . |
| 4,422,217 | 12/1983 | Barrette . |
| 4,862,507 | 8/1989 | Thompson . |
| 4,862,560 | 9/1989 | Lichtenberg . |
| 4,993,669 | 2/1991 | Dyer . |
| 5,102,075 | 4/1992 | Dyer . |
| 5,121,524 | 6/1992 | Mortensen . |
| 5,193,251 | 3/1993 | Fortsch . |
| 5,544,391 | 8/1996 | Hoffmann . |
| 5,653,409 | 8/1997 | White, Jr. et al. . |

*Primary Examiner*—James R. Brittain
*Attorney, Agent, or Firm*—Hoffmann & Baron, LLP

[57] ABSTRACT

A bundling tie for bundling a plurality of cables or like articles includes a strap and a head for receiving the strap. The strap is an elongate member having a first end, a second end and a planar body. The head includes an upstanding central wall separating first and second parallel passageways for receipt of the first and second ends of the strap. A locking device is supported by the central wall. The locking device includes a body having a central joining section and a pair of parallel walls extending from the joining section. The locking device further includes a first barb extending from one of the wall members into the first passageway and a second barb extending from the other wall member into the second passageway. The barbs are provided for independent deflectable locking engagement with the first and second strap ends upon insertion into the passageways.

10 Claims, 3 Drawing Sheets

CABLE TIE HAVING A LOCKING HEAD AND A SEPARATE STRAP

CROSS REFERENCE TO RELATED APPLICATION

This application claims priority to U.S. Provisional Patent Application Ser. No. 60/067,183 filed on Dec. 1, 1997.

FIELD OF THE INVENTION

The present invention relates generally to cable ties for bundling a plurality of wires, cables or the like. More specifically the present invention relates to a cable tie having a separate cable tie head and strap where the cable tie head secures both ends of the strap about a bundle of wires.

BACKGROUND OF THE INVENTION

The use of cable ties to bundle a plurality of wires, cables or similar objects has long been known. Many of the cable ties presently available include a cable tie strap body having a head integrally formed at one end and a tail at the other end. The head includes an aperture therein through which the tail may be inserted. A locking device in the head securely locks the tail within the head upon looping the strap about a bundle of wires or other objects. Examples of such cable ties are shown in U.S. Pat. Nos. 3,739,430 and 3,872,547.

Other types of cables ties which are also available include assemblies where the cable tie head is formed separately from an elongate strap body. These cable ties include locking devices supported within the head which are capable of engaging opposite ends of the strap body when the strap body is looped about a bundle of wires. Such two-piece construction allows the use of a long length of strap thus permitting the cable tie assembly to be used to secure a bundle of wires having a large diameter.

With respect to the two-component design since the cable tie head must include a locking device which securely locks both ends of the strap, various dual locking devices have been developed so as to secure the ends of the strap within the head. One such cable tie is shown in U.S. Pat. No. 4,498,507 where a single barb is employed in the head. The barb has one end which is separated in a fork-type configuration so that one end of the fork engages one end of the strap while the other end of the fork engages the other end of the strap inserted in the head.

Other two-component cable tie assemblies where the head is separate from the strap employ a strap locking device in the form of a metal barb which is embedded in the cable tie head. The metal barb in these designs are formed into generally a V-shaped cross-sectional configuration. One leg of the V extends in one direction to engage one end of the strap inserted through the head and the other leg of the V extends in an opposite direction to engage the other end of the strap once it has been secured about a bundle of wires. Examples of such cable tie constructions having V-shaped metallic locking barbs are shown in U.S. Pat. Nos. 4,422,217; 4,993,669; 5,102,075 and 5,544,391.

However, in each of these designs a single locking barb is used to lock both ends of the cable tie strap inserted through the head. While these designs adequately lock the cable strap in the head, since the barb is an integrally formed single member, the insertion forces required to insert the strap into the head and to deflect the barb are extremely high. This is due in part because of the integral construction of the barb and the necessity for the entire barb to deflect. It is especially difficult to insert the second end of the strap, after the first end has been inserted, as the entire barb has been deflected by insertion of the first strap end.

The art has seen attempts to reduce the insertion force necessary to insert both ends of the strap into a cable tie head by employing metallic barbs of two-piece construction. Such metallic barbs are separately secured within the cable tie head and may be supported on flexible platforms or hinges so as to permit easy deflection of the barb upon insertion of the strap into the head. Examples of such two-piece barb constructions are shown in U.S. Pat. Nos. 5,121,524 and 5,193,251.

While each of these separate barb designs serve adequately for their intended purposes, it has been found that in certain applications and under extreme environmental conditions, the plastic support for the metal barbs may not be as reliable as may be required.

It is therefore desirable to provide a two-component cable tie assembly which includes a head and a separate strap which secures both ends of the strap within the head upon looping the strap about a bundle of wires. Further the ends of the strap are to be securely retained within the head and provide for low insertion force of the strap into the head.

SUMMARY OF THE INVENTION

It is an object of the present invention to provide an improved self-locking bundling tie of the type including a locking head and a separate elongate strap where the head includes a locking device for securing both ends of the strap.

It is a further object of the present invention to provide a single metallic barb in a bundling tie which provides for locking engagement of both ends of a bundling strap inserted into the head.

It is a still further object of the present invention to provide a bundling tie having a locking barb supported in the head where the locking barb has a pair of deflectable barbs, each of the barbs being independently deflectable with respect to each other for locking engagement of both ends of the strap.

In the efficient attainment of these and other objects, the present invention provides a dual component bundling tie. The bundling tie includes an elongate strap having a planar body with first and second opposed ends. A head includes an upstanding center wall separating a first and second elongate parallel passageways therethrough. The passageways provide for respective receipt of the first and second ends of the strap once the strap is coiled about a bundle of cables or the like. The center wall includes oppositely facing sidewalls which define the first and second passageways. A locking device is supported by the center wall. The locking device includes a body having a central joining section and a pair of spaced apart parallel wall members extending from the central joining section along respective ones of the oppositely facing sidewalls of the central wall. The locking device further includes a first barb extending from one of the wall members into the first passageway and an oppositely directed second barb extending from the other of the wall members into the second passageway. The barbs are provided for independent deflectable locking engagement with the first and second strap ends upon insertion of the strap ends into the passageways in an insertion direction.

More particularly described by way of the preferred embodiment herein, the locking device includes a body having generally a U-shape with a central arcuate section. The sidewalls of the body include lances for biting engagement with the sidewalls of the center wall for additionally confining the locking device in the head. The barbs extend from the distal end of the wall members for independent deflection thereabout. The head of the bundling tie further includes stop surfaces for engagement with the deflectable barbs to prevent over-deflection of the barbs upon an attempt to withdraw the first and second strap ends from the passageways in a withdrawal direction opposite the insertion direction.

DETAILED DESCRIPTION OF THE INVENTION

The present invention provides an improved design for a bundling tie such as a cable tie which includes a separate head and elongate strap. The bundling tie of the present invention is of the type shown in U.S. Pat. No. 5,193,251 issued Mar. 16, 1993 to Fortsch, which is assigned to the assignee of the present invention, and which is incorporated by reference herein for all purposes.

Figure 1:
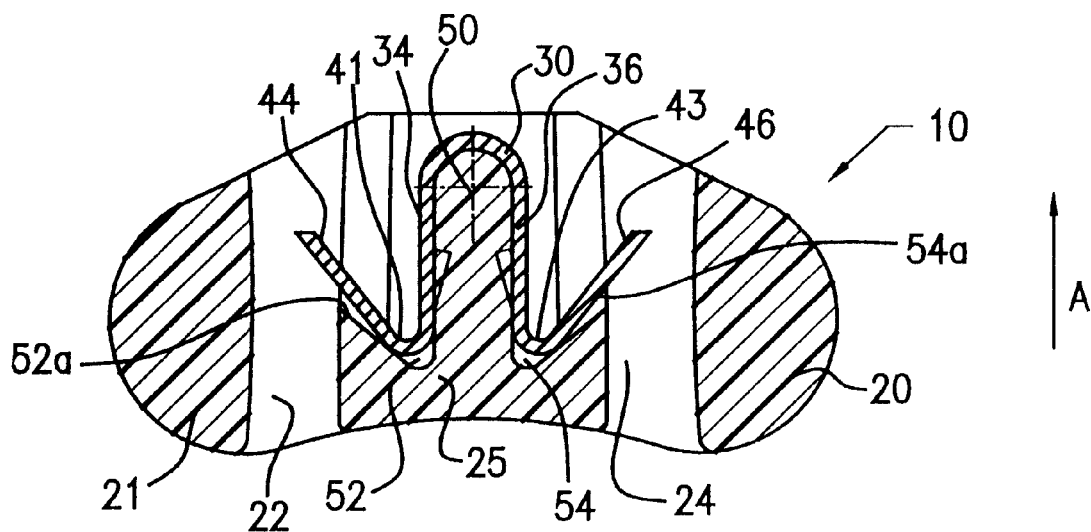
FIG. 1 is a cross-sectional showing of the head of the bundling tie of the present invention.
Figure 2:
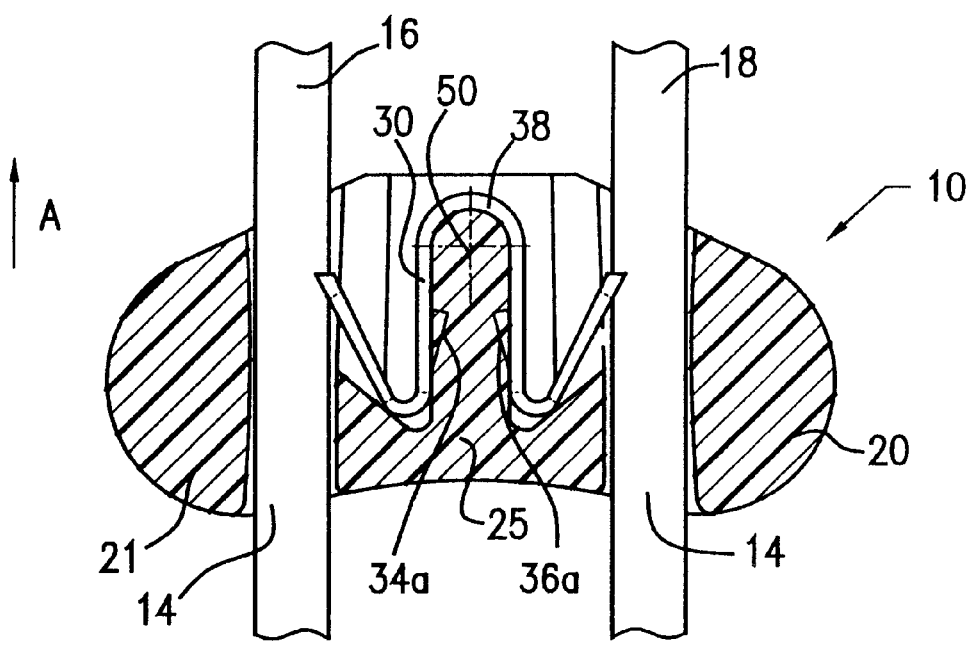
FIG. 2 is a cross-sectional showing of the head of FIG. 1 accommodating the ends of a strap of the bundling tie of the present invention.

Referring to FIGS. 1 and 2, the cable tie assembly 10 of the present invention is designed to be looped around a plurality of electrical cables or similar articles which are formed in a bundle (not shown). The cable tie assembly 10 is a two-piece member formed of a high strength molded plastic such as nylon and is suitable for both indoor and outdoor use.

The two-piece construction of cable tie assembly 10 includes an elongate generally planar cable tie strap 14 having opposed ends 16 and 18 which are designed to be looped around the cable bundle. Cable tie strap 14 typically has a generally rectangular cross-sectional configuration, although other may shapes may be employed.

Figure 3:
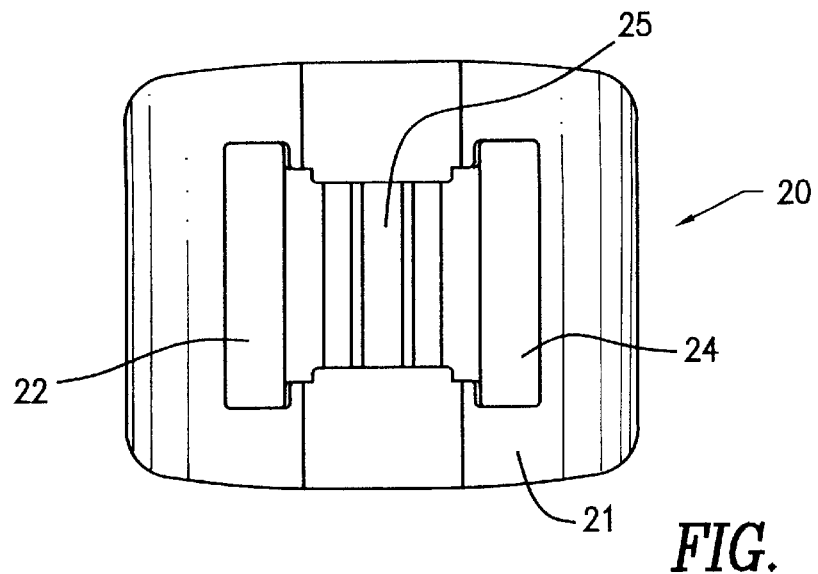
FIGS. 3, 4 and 5 are top, cross-sectional and bottom views respectively of the head of the bundling tie of the present invention with the barb removed
Figure 4:
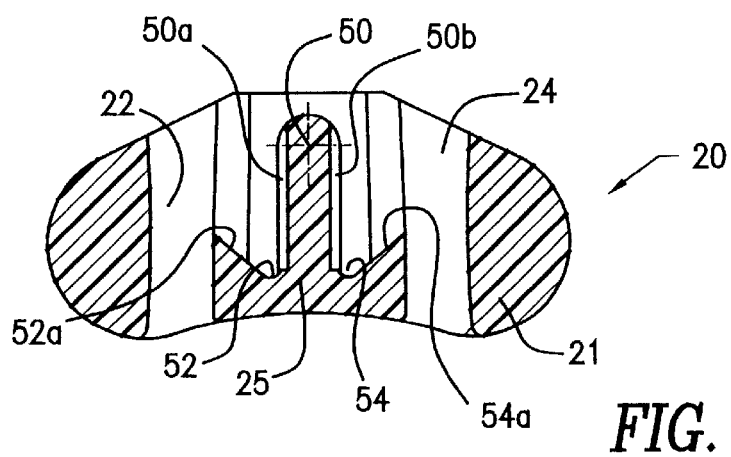
Figure 5:
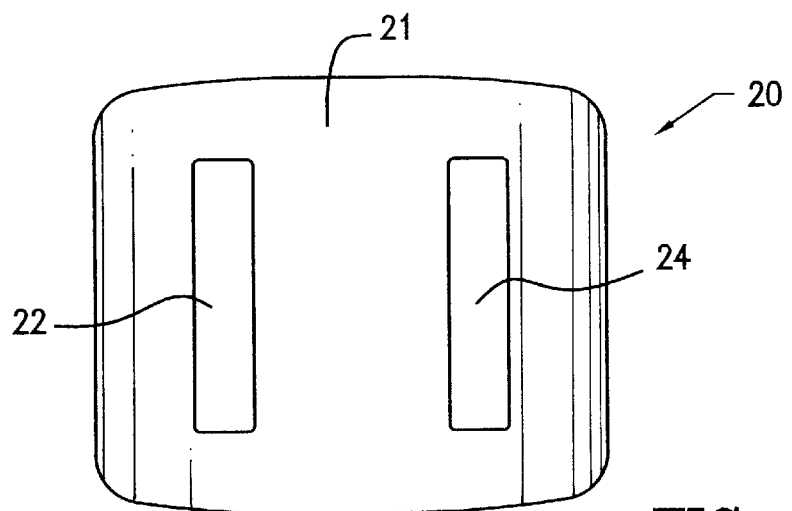
Figure 6:
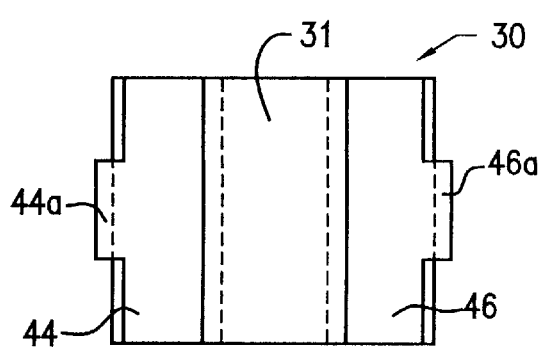
FIG. 6 is a top plan view of the barb employed in the head of the bundling tie of the present invention.
Figure 7:
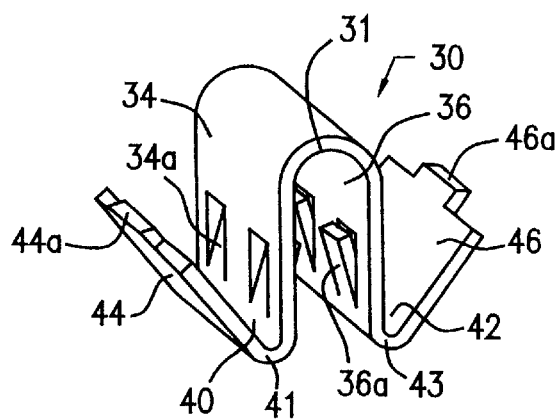
FIG. 7 is a perspective showing of the barb of FIG. 6.
Figure 8:
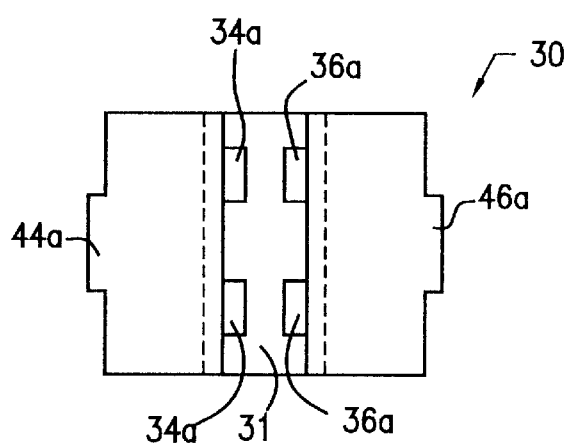
FIG. 8 is a bottom plan view of the barb of FIG. 6.
Figure 9:
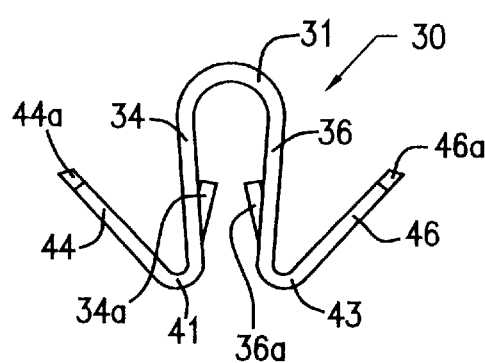
FIG. 9 is an end elevational showing of the barb of FIG. 6.

The ends 16 and 18 of strap 14 may be secured within a separately formed head 20 of cable tie assembly 10. As shown further in FIGS. 3–5 in top, sectional and bottom views respectively, head 20 includes a body 21 having a pair of spaced apart side-by-side parallel passageways 22 and 24 extending therethrough for insertably accommodating respectively the ends 16 and 18 of strap 14. Body 21 includes a central supporting structure 25 which will be described in detail hereinbelow.

In order to secure ends 16 and 18 of strap 14 in head 20, a metallic locking device 30 is supported within head 20. Locking device 30, more fully shown in FIGS. 6–9, is an integrally formed metallic member preferably formed of a copper alloy exhibiting sufficient rigidity yet is relatively resiliently deflectable. Locking device 30 may be formed from a flat metal stamping and is configured in a manner to be supported within head 20. Locking device 30 includes a central body 31 formed in a inverted U-shaped configuration. This U-shaped configuration defines a pair of generally parallel sidewalls 34 and 36 and a arcuate central joining section 38 therebetween. The distal ends of the sidewalls 34 and 36 include bent portions 40 and 42 extending back at a reverse angle in the direction of central section 38. Each reversely bent portion 40 and 42 includes a curved extent 41, 43 and extending planar strap engaging barbs 44 and 46 which are designed for locking engagement with the ends 16 and 18 of strap 14 upon insertion into passageways 22 and 24 of head 20. The distal ends of strap engaging barbs 44 and 46 include a knife-like piercing extent 44a and 46a extending therefrom. Knife-like piercing extents 44a and 46a have a transverse width which is less than the width of barbs 44 and 46 so as to permit biting insertion into strap ends 16 and 18 (FIG. 2) preventing withdrawal once engagement is made. The knife-like piercing extents 44a and 46a may also include a beveled edge to assist insertion of the barbs into biting engagement with the strap ends 16 and 18.

Each parallel sidewall 34 and 36 of locking device 30 includes a pair of side-by-side inwardly directed lances 34a and 36a. Lances 34a and 36a are provided so as to secure and positional confine locking device 30 within head 20.

Referring again to FIGS. 1 and 2, body 21 of head 20 is provided with a central upwardly extending wall 50 which is insertably received in the U-shaped configuration formed by locking device 30 upon insertion of the locking device into head 20. The central wall 50 defines oppositely facing side walls 50a and 50b which define passageways 22 and 24. Upon placement of locking device 30 over central wall 50, the sidewalls 34 and 36 of body 31 will lie against respective opposed sidewalls 50a and 50b of central wall 50. The inwardly directed lances 34a and 36a dig into the opposed sidewalls 50a and 50b (FIG. 4) of the upwardly extending member 50 securing the locking device therein. Body 21 also includes a pair of side-by-side cavities 52 and 54 for accommodating the curved extents 41 and 43 of locking device 30. Cavities 52 and 54 are further defined by angled walls 52a, 54a which provide a barb stop preventing over deflection of barb 44, 46 upon an attempt to withdraw strap ends 16 and 18 from passageways 22 and 24.

Having described the construction of the cable tie assembly 10 of the present invention, its use may now be illustrated. Referring to FIGS. 1 and 2, one end 16 of strap 14 is inserted into passageway 22 in the direction of arrow A defining an insertion direction. Such insertion causes deflection of barb 44 about curved extent 41 permitting passage of strap end 16 therethrough. As may be appreciated, the deflection of barb 44 substantially occurs about curved extent 41. Substantial movement of sidewall 34 is restricted as sidewall 34 lies against sidewall 50a of central wall 50. It is contemplated however that due to manufacturing tolerances between sidewalls 34, 36 and upwardly extending wall 50 there may be slight deflection of parallel sidewall 34 about arcuate central section 38. However upon insertion of strap end 16 through passageway 22 there is substantially no deflection of opposite sidewall 36 or opposite barb 46. Thus the entire deflection which is required in order to insert strap 16 into passageway 22 is achieved by the deflection of barb 44 extending into passageway 22 without interaction with or deflection of barb 46 extending into opposite passageway 24. The remainder of the strap 14 may be looped around the bundle of cables and the opposite end 18 of strap 14 may be inserted in passageway 24. Upon such insertion similar deflection of barb 46 occurs about curved extent 43. Again, substantially all deflection is achieved at curved extent 41. It is contemplated that a limited degree of deflection of sidewall 36 may occur at arcuate section 38. However, no deflection of barb 44 is caused by the insertion of strap end 18 into passageway 24. Thus the insertion of the second strap end 18 into passageway 24 sees similar insertion forces as does the insertion of first strap end 16 into passageway 22.

The barb construction of the present invention is independently deflectable on either side of arcuate central section 38. Thus the construction does not result in increased insertion forces for the second inserted strap end as does the barb constructions of the prior art.

Furthermore, upon insertion of strap ends 16 and 18 into passageways 22 and 24 respectively, locking engagement is maintained between barbs 44 and 46 by the biting engagement of knife-like piercing extents 44a and 46a into the strap body. Upon an attempt to withdraw either strap end 16, 18 in a withdrawal direction opposite arrow A, the knife-like piercing extents 44a and 46a prevent such withdrawal. Over deflection of barbs 44a and 46a is further prevented by the barb stop formed by angled cavity walls 52a and 54a. The barbs 44a and 46b, upon a withdrawal attempt, will resiliently bend back against angled walls 52a and 54a, which forms a stop preventing further deflection.

Figure 10:
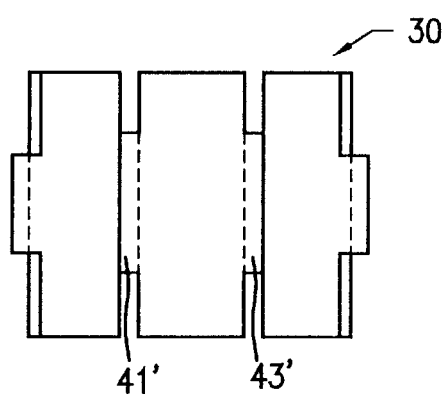
FIG. 10 is a bottom plan view of a further embodiment of a barb of the type shown in FIG. 6.
Figure 11:
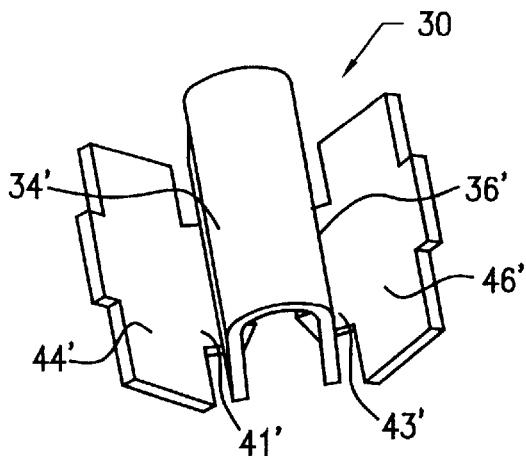
FIG. 11 is a top perspective view of the barb of FIG. 10.

Referring additionally to FIGS. 10 and 11, a further embodiment of the locking device 30 is shown. Locking device 30' is substantially similar to locking device 30 described above, however the curved extents 41' and 43' extending between parallel sidewalls 34' and 36' and strap engagement barbs 44' and 46' are of reduced transverse width. Such construction makes locking device 30 more deflectable than curved extents 41 and 43 thereby resulting in lower insertion forces for strap 16 and 18.

Various changes to the foregoing described and shown structures would now be evident to those skilled in the art. Accordingly, the particularly disclosed scope of the invention is set forth in the following claims.

What is claimed:

1. A bundling tie comprising:

an elongate strap having a first end, a second end and an elongate planar strap body therebetween;

a head having an upstanding central wall separating a first and second elongate parallel passageways through said head for respective receipt of said first and second ends of said strap, said central wall having oppositely facing sidewalls defining said first and second passageways; and a locking device supported by said central wall, said locking device including a body having a central joining section and a pair of a spaced apart parallel wall members extending from said central joining section along respective ones of said oppositely facing side wall of said central wall of said head, said locking device further includes a first barb extending from one of said wall members into said first passageway and a second barb extending from the other of said wall members into said second passageway for independent deflectable locking engagement with said first and second strap ends upon insertion thereof into said first and second passageways in an insertion direction.

2. A bundling tie of claim 1 wherein said wall members are elongate and wherein said barbs extend from distal ends of said wall members for said independent deflection thereabout.

3. A bundling tie of claim 2 wherein said wall members include opposed inwardly directed lances for biting engagement with said side walls of said central wall for positionally confining said locking device.

4. A bundling tie of claim 3 wherein said locking device body is generally U-shaped and wherein said central joining section is arcuate.

5. A bundling tie of claim 4 wherein said distal extents of said wall members are reversely bent with respect to said elongate wall members.

6. A bundling tie of claim 5 wherein said head includes first and second side cavities in respective communication with said first and second passageways for accommodating said first and second barbs.

7. A bundling tie of claim 6 wherein said first and second cavities are defined by respective angled wall surfaces, said angled wall surfaces being engagable with said barbs to form stop surfaces preventing over deflection of said barbs upon an attempt to withdraw said first and second strap ends in a withdrawal direction opposite said insertion direction.

8. A bundling tie of claim 5 wherein said barbs include knife-like piercing extents having beveled edges to assist in insertion into said strap.

9. A bundling tie of claim 5 wherein said knife-like piercing extents have a width which is less than the width of said barbs.

10. A bundling tie of claim 5 wherein said distal ends of said barb wall members are of reduced transverse width.

* * * * *